(12) United States Patent
Naganuma

(10) Patent No.: US 8,059,135 B2
(45) Date of Patent: Nov. 15, 2011

(54) IMAGE OUTPUT APPARATUS, IMAGE OUTPUT METHOD AND IMAGE OUTPUT PROGRAM PRODUCT

(75) Inventor: Yuzuru Naganuma, Osaka (JP)

(73) Assignee: Kyocera Mita Corporation (JP)

( * ) Notice: Subject to any disclaimer, the term of this patent is extended or adjusted under 35 U.S.C. 154(b) by 806 days.

(21) Appl. No.: 12/122,846

(22) Filed: May 19, 2008

(65) Prior Publication Data

US 2008/0292205 A1 Nov. 27, 2008

(30) Foreign Application Priority Data

| May 23, 2007 | (JP) | 2007-136271 |
| May 23, 2007 | (JP) | 2007-136272 |
| Oct. 31, 2007 | (JP) | 2007-282922 |
| Oct. 31, 2007 | (JP) | 2007-282923 |

(51) Int. Cl.
G09G 5/02 (2006.01)
G09G 5/00 (2006.01)
G06T 11/20 (2006.01)
G06T 11/00 (2006.01)
H04N 1/405 (2006.01)

(52) U.S. Cl. ........ 345/597; 345/441; 345/467; 345/611; 358/3.11

(58) Field of Classification Search .......... 345/596–599, 345/611, 441–443, 467; 358/3.13–3.18
See application file for complete search history.

(56) References Cited

U.S. PATENT DOCUMENTS

| 6,943,808 B2 * | 9/2005 | Hains et al. ................... 345/611 |
| 2002/0122191 A1 * | 9/2002 | Kitagawara .................... 358/1.9 |
| 2005/0220360 A1 * | 10/2005 | Zaklika et al. ................. 382/275 |

FOREIGN PATENT DOCUMENTS

| JP | 9-186902 | 7/1997 |
| JP | 2002-262113 | 9/2002 |
| JP | 2004-40499 | 2/2004 |
| JP | 2006-317528 | 11/2006 |
| JP | 2007-116433 | 5/2007 |

* cited by examiner

Primary Examiner — Ryan R Yang
(74) Attorney, Agent, or Firm — Gerald E. Hespos; Michael J. Porco

(57) ABSTRACT

An image output apparatus is provided with an image conversion unit for converting image data into an output image of intermediate gradation using a line screen for forming pixel points in stripes, an element angle storing unit for storing the angle information of line segments of the image data, a jaggy judging unit for judging whether or not jaggies will appear on the outline of the output image based on the angle information of the line segments stored in the element angle storing unit, and a screen angle setting unit for substantially changing the screen angle of the line screen if jaggies are judged to appear by the jaggy judging unit.

17 Claims, 14 Drawing Sheets

FIG.2A

| 33 | 34 | 35 | 36 | 37 | 38 | 39 | 40 |
|----|----|----|----|----|----|----|----|
| 1  | 2  | 3  | 4  | 5  | 6  | 7  | 8  |
| 49 | 50 | 51 | 52 | 53 | 54 | 55 | 56 |
| 17 | 18 | 19 | 20 | 21 | 22 | 23 | 24 |
| 41 | 42 | 43 | 44 | 45 | 46 | 47 | 48 |
| 9  | 10 | 11 | 12 | 13 | 14 | 15 | 16 |
| 57 | 58 | 59 | 60 | 61 | 62 | 63 | 64 |
| 25 | 26 | 27 | 28 | 29 | 30 | 31 | 32 |

DITHER TABLE FOR SCREEN ANGLE OF 0° (DENSITY 50 %)

FIG.2B

| 25 | 57 | 9  | 41 | 17 | 49 | 1 | 33 |
|----|----|----|----|----|----|---|----|
| 26 | 58 | 10 | 42 | 18 | 50 | 2 | 34 |
| 27 | 59 | 11 | 43 | 19 | 51 | 3 | 35 |
| 28 | 60 | 12 | 44 | 20 | 52 | 4 | 36 |
| 29 | 61 | 13 | 45 | 21 | 53 | 5 | 37 |
| 30 | 62 | 14 | 46 | 22 | 54 | 6 | 38 |
| 31 | 63 | 15 | 47 | 23 | 55 | 7 | 39 |
| 32 | 64 | 16 | 48 | 24 | 56 | 8 | 40 |

DITHER TABLE FOR SCREEN ANGLE OF 90° (DENSITY 50 %)

“RE” in FIG. 1B.

IMAGE OUTPUT APPARATUS, IMAGE OUTPUT METHOD AND IMAGE OUTPUT PROGRAM PRODUCT

BACKGROUND OF THE INVENTION

1. Field of the Invention

The present invention relates to an image output apparatus, an image output method and an image output program product for expressing the shading of an output image using a line screen.

2. Description of the Related Art

In image output apparatuses such as image forming apparatuses and image display apparatuses, there is generally used a method for expressing the shading of an output image using a line screen.

There is also known a dither method for expressing the shading by increasing or decreasing the number and/or size of dots. Particularly, a method for generating a stripe pattern and expressing multi-gradation by changing the number and/or width of strips is called a dither method using a line screen (FIGS. 1A, 1B: described in detail later).

Generally, in a color image forming apparatus, images are formed using four color toners of C (cyan), M (magenta), Y (yellow) and K (black). Thus, upon displaying an intermediate color, the intermediate color is expressed by the dither method using a line screen. At this time, an intermediate graduation of the line screen is expressed for each toner color, and the intermediate color is expressed by superimposition printing of the respective toner colors.

In this case, each plane (toner output plane) has a different angle (screen angle) as shown in FIG. 3 lest a moire pattern should be formed by toner stripe patterns to be superimposed. The respective screen angles are set different, e.g. 75° for magenta, 45° for black, 15° for cyan and 0° for yellow.

However, upon printing by the dither method using a line screen, if angles of thin line segments constituting the stripe pattern and dot forming angles (screen angles) in the dither method approximate, the unevenness (jaggies) of the lines segments stands out.

FIG. 1A shows an image of a character "RE" in Japanese katakana (character similar to "V" in alphabet) in a case where the angle of a line segment of an oblique stroke P1 of "RE" approximates to a screen angle upon expressing this character "RE" similar to "V" using a mono-color line screen. FIG. 1B shows an example in which the angle of a line segment of an oblique stroke P2 of "RE" largely differ from the screen angle. In FIGS. 1A and 1B, the size of pixel points is enlarged so that the state of the line screen can be easily understood. If FIGS. 1A and 1B are seen from a more distant point, the appearance of jaggies making the unevenness of the outline of the character is more noticeable in the oblique stroke P1 of "RE" in FIG. 1A as compared to the oblique stroke P2 of "RE" in FIG. 1B.

SUMMARY OF THE INVENTION

An object of the present invention is to provide technology for suppressing the appearance of jaggies upon printing by a dither method using a line screen.

One aspect of the present invention seeking to accomplish the above object is directed to an image output apparatus, comprising an image conversion unit that converts image data into an output image of intermediate gradation using a line screen for forming pixel points in stripes; an element angle storing unit that stores the angle information of line segments of the image data; a jaggy judging unit that judges whether or not jaggies will appear on the outline of the output image based on the angle information of the line segments stored in the element angle storing unit; and a screen angle setting unit that substantially changes the screen angle of the line screen if jaggies are judged to appear by the jaggy judging unit.

Another aspect of the present invention is directed to an image output method, comprising the steps of converting image data into an output image of intermediate gradation using a line screen for forming pixel points in stripes; obtaining the angle information of line segments of the image data; and setting a screen angle of the line screen based on the angle information of the line segments such that a jaggy phenomenon appearing on the outline of the output image is minimized.

Still another aspect of the present invention is directed to an image output program product, comprising a storage medium; and an image output program stored in the storage medium, wherein the image output program causes an image output apparatus capable of performing an image output operation to perform a processing of converting image data into an output image of intermediate gradation using a line screen for forming pixel points in stripes; a processing of reading the angle information of line segments of the image data stored beforehand; and a processing of setting a screen angle of the line screen based on the angle information of the line segments such that a jaggy phenomenon appearing on the outline of the output image is minimized.

These and other objects, features, aspects and advantages of the present invention will become more apparent upon a reading of the following detailed description and accompanying drawings.

BRIEF DESCRIPTION OF THE DRAWINGS

FIGS. 1A and 1B are diagrams showing a relationship between a dither pattern and a jaggy phenomenon, wherein FIG. 1A shows a case where the jaggy phenomenon is noticeable and FIG. 1B shows a case where the jaggy phenomenon is unnoticeable, FIG. 2A is a diagram showing an exemplary dither table for a screen angle of 0° and FIG. 2B is a diagram showing an exemplary dither table for a screen angle of 90°.

DETAILED DESCRIPTION OF THE PREFERRED EMBODIMENTS

Hereinafter, several embodiments of the present invention are described with reference to the accompanying drawings. Here, image forming apparatuses are illustrated as examples of an image output apparatus, and various modes for effectively reducing unevenness (jaggies) significantly noticeable on the edge parts and the like of thin lines and small characters upon expressing an intermediate gradation by a dither method using line screens.

First Embodiment

In an image forming apparatus according to a first embodiment, in order to reduce jaggies, line screens respectively set for color elements are replaced between the color elements and combined so that the angle of a line segment element most frequently seen in an image does not approximate to edge angles of the line screens.

[Replacement of Dither Tables to Suppress the Appearance of Jaggies]

Figure 1A:
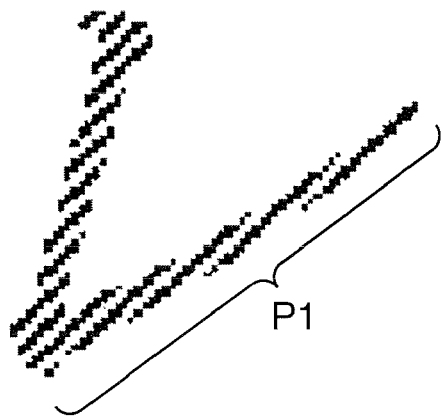
Figure 1B:
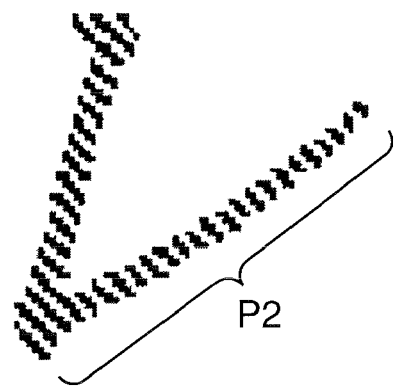

Upon expressing an intermediate color with a stripe pattern by a dither method (dither method using a line screen), unevenness (hereinafter, called "jaggies") is particularly noticeable on edge parts of thin lines and small characters having an angle approximate to the angle of the stripe pattern (screen angle) (particularly the edge parts in italic characters), wherefore lines, characters and the like cannot look beautiful (FIG. 1A).

The image forming apparatus of this embodiment is an image forming apparatus for forming a color image using a plurality of color toners such as toners of cyan (C), magenta (M), yellow (Y) and black (K). If the appearance of jaggies in an image data including characters is predicted, the appearance of jaggies can be suppressed by replacing dither tables for calculation (two-dimensional tables describing stripe patterns; FIGS. 2A, 2B) for generating stripe patterns set for the respective toner colors between the toner colors.

FIGS. 2A and 2B show examples of an 8×8 two-dimensional matrix dither table. Out of 64 pixels, dots are printed at corresponding pixel positions in accordance with a color value (image density). Hatched parts indicate the pixel positions where the dots are printed. The dither tables shown in FIGS. 2A, 2B correspond to the case of 50% density, and 50% of 64 pixels, i.e. 32 pixels are hatched. Numbers 1 to 32 are assigned to these hatched pixels.

In the dither table of FIG. 2A, a stripe pattern is horizontally formed, and the screen angle of the line screen in this case is 0°. In the dither table of FIG. 2B, a stripe pattern is vertically formed, and the screen angle of the line screen in this case is 90°. Line screens using dither tables are not limited to the cases where the screen angles are 0° and 90° as shown in FIGS. 2A and 2B, and oblique screen angels (e.g. 30°) can be realized by similar methods (by changing the arrangement of the numbers).

In this embodiment, the appearance of jaggies is suppressed by suitably exchanging such dither tables between the toner colors. In order to realize this, information on the most frequently seen angle (most frequent angle data) out of the angles of line segments constituting characters of the character data is utilized as the attribute information of the character data. Here, the "frequently seen angle" can be understood as follows in an example. In the case of breaking down one character into many line segments constituting this character at a specified resolution, the frequently seen angle is an angle in a zone having a highest frequency when the angles of the respective line segments with respect to a reference direction (e.g. angles of the lines segments with respect to a horizontal direction) are obtained and an angle distribution of all the line segments is obtained.

This angle information can be stored in a ROM (Read Only Memory) of the image forming apparatus after obtaining vector directions from a bitmap or outline of font data through the analysis by a font information managing section (element angle storing unit) beforehand if the font data is available in the ROM.

The most frequent angle data may be obtained page by page of images to be formed for a jaggy appearance judgment to be described later. In this case, a method can be adopted according to which the most frequent angle data of each font is counted every time this font appears in the image data to obtain the most frequent angle data page by page.

If a bitmap is directly transmitted from a host computer, a faster processing is possible by judging whether or not italic is set for characters and analyzing the bitmap and outline using an italic angle as character angle information.

The image forming apparatus of this embodiment includes a jaggy judging unit for judging whether or not jaggies will appear from a character color and a difference between a screen angle and a character angle stored as the attribute information of the characters if print data is character data. If jaggies are judged to be likely to appear in an image to be formed by the jaggy judging unit, the dither tables set at different angles for the respective toner color planes (toner output planes) are replaced between the planes to prevent the jaggy from becoming noticeable.

[Method for Jaggy Judgment and Screen Angle Setting]

Next, an example of a judgment method in the jaggy judging unit is described. First of all, it is judged whether or not the respective color values of planes representing the colors of characters (e.g. generally cyan (C), magenta (M), yellow (Y) and black (K) in laser printers) indicate intermediate gradations (no solid gradations). In the case of solid gradations, a normal processing is performed since jaggies resulting from the stripe pattern do not appear.

If the planes indicate the intermediate gradations, the screen angle of the plane having the largest color value (toner color most used in character printing of a printed material) is used in judging whether or not jaggies are likely to appear. If the difference between the screen angle and the character angle (the angle of the line segment most frequently used in a certain font, the angle of italic faces used in italic characters in the diagrams as described above) is equal to or smaller than a specified threshold value, jaggies as shown in FIG. 1A are judged to be unlikely to appear.

If the appearance of jaggies is judged to be likely, a dither table of a plane (other color element) having a screen angle capable of suppressing the appearance of jaggies and different from the originally used dither table is used as a plane for the largest color value in the generation of a halftone pattern which will becomes the character color. Thus, the appearance of jaggies can be suppressed to a minimum level.

Figure 3:
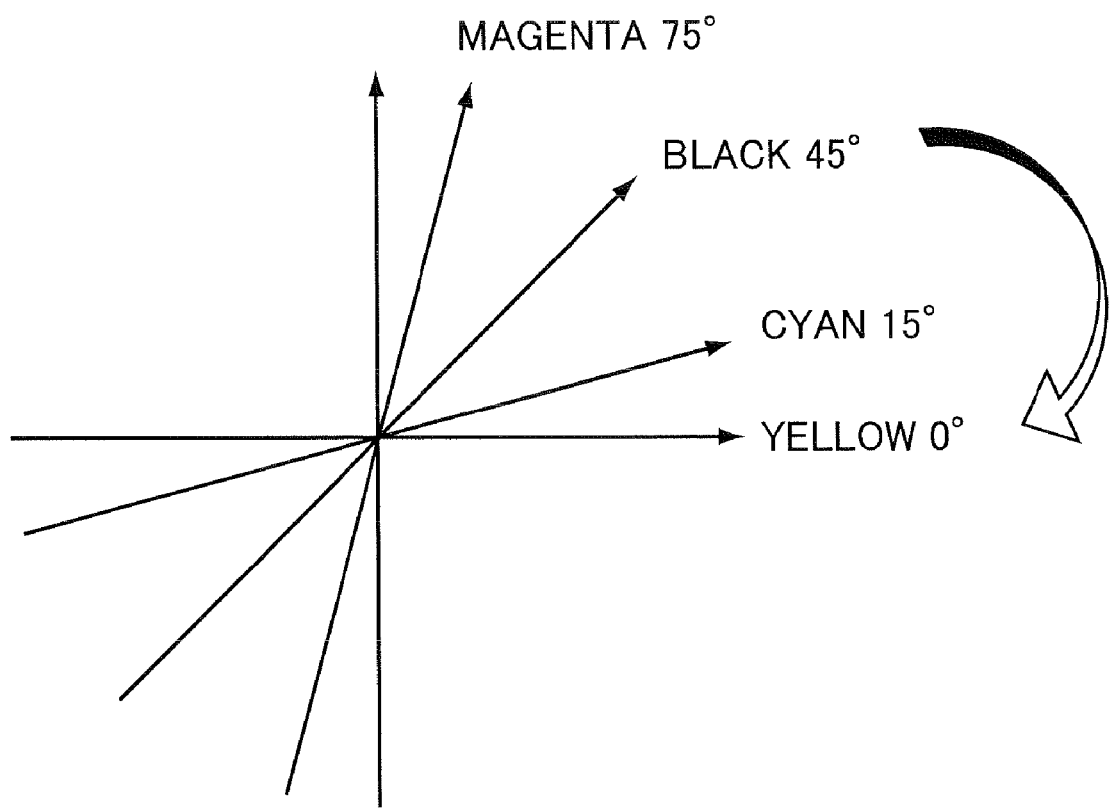
FIG. 3 is an arrangement diagram of screen angles by toner colors in a normal dither table.

For example, if the characters have a Gray value as an intermediate gradation given by black toner and the angle thereof is approximate to 45° and equal to or smaller than the above threshold value, many jaggies appear if the same screen angle is used since the screen angle of the black toner expressing Gray is 45° (see FIG. 3). Accordingly, jaggies become unnoticeable by using a dither table of Yellow having a screen angle of 0° to generate an intermediate gradation expressing the Gray value.

In the case of forming a plane of an intermediate gradation by a plurality of colors, it is also possible to allocate light Yellow for a plane with a screen angle having the most appearance of jaggies if the plane of an unused color is lacking.

As described above, if the appearance of jaggies is predicted based on the angle information of the characters, such appearance of jaggies is suppressed by replacing the screen angles determined for the respective toners.

[Apparatus Construction]

Figure 4:
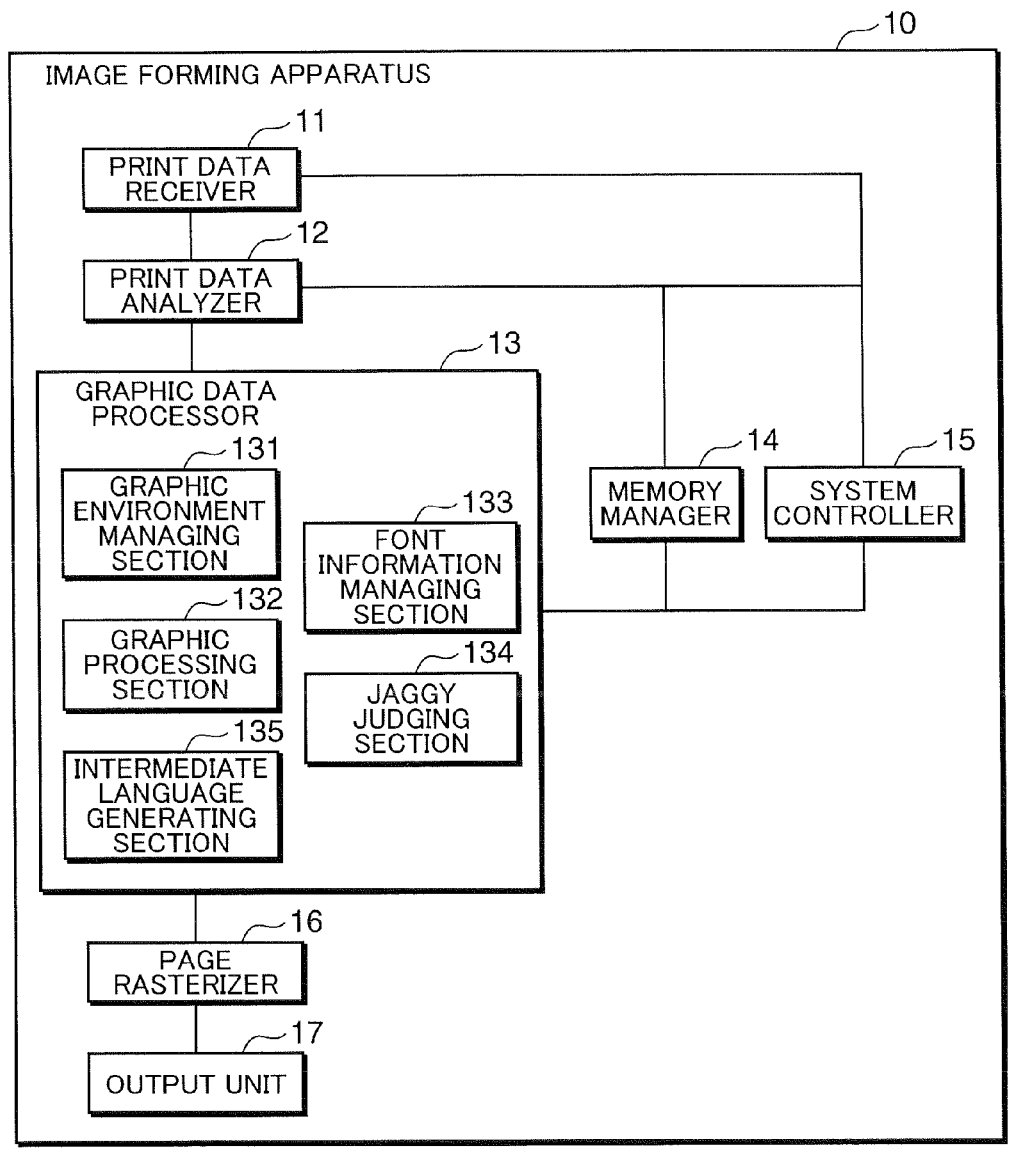
FIG. 4 is a functional block diagram of an image forming apparatus according to a first embodiment of the invention.

FIG. 4 is a functional block diagram of an image forming apparatus 10 according to the first embodiment. The image forming apparatus 10 is provided with a print data receiver 11, a print data analyzer 12, a graphic data processor 13, a memory manager 14, a system controller 15, a page rasterizer 16 (image conversion unit) and an output unit 17.

The graphic data processor 13 is functionally provided with a graphic environment managing section 131, a graphic processing section 132 (screen angle setting unit), a font information managing section 133 (element angle storing unit), a jaggy judging section 134 (jaggy judging unit) and an intermediate language generating section 135. The respective functional parts are described below.

The print data receiver 11 receives print data (image data) transmitted from an unillustrated PC (Personal Computer).

The print data analyzer 12 analyzes data to be converted into an intermediate language (display list) by analyzing the content of the print data written in a page description language. The print data analyzer 12 also judges whether or not the respective elements are character data or whether or not the respective planes (output planes for the respective toners) are outputs containing intermediate colors.

The graphic data processor 13 processes graphic data for suppressing the appearance of jaggies.

The graphic environment managing section 131 manages configuration information on graphics such as set matrices for size enlargement and reduction, presently effective colors and dither tables.

The graphic processing section 132 processes complicated graphics into simple graphic primitives and sets an optimal screen angle to suppress a jaggy phenomenon based on the angle information on line segments of the font stored in the font information managing section 133.

The font information managing section 133 stores the attribute information of characters to be imaged, i.e. normal font information, and the most frequent angle data of the font described above or information on the angle of italic faces used in italic characters.

The jaggy judging section 134 judges whether or not jaggies are likely to appear based on the color, the attribute information of the characters and the screen angle.

The intermediate language generating section 135 generates a display list (intermediate language) based on the information processed by the graphic processing section 132.

The memory manager 14 manages memories of a system. The system controller 15 manages the common information of the system to control the system.

The page rasterizer 16 decrypts the display list generated by the intermediate language generating section 135 to rasterize one page. At this time, the page rasterizer 16 converts the data into an output image of intermediate gradation using a line screen generated by the dither method using a stripe pattern.

The output unit 17 has a print engine as a printing mechanism, and actually prints an image on a recording medium (generally paper sheet, OHP sheet, or the like).

In the functional block diagram of FIG. 4, parts not related to the substance of the present invention such as an image reader and a sheet feeding mechanism, which are normally provided in the image forming apparatus, are not shown.

[Flow Chart]

Figure 5:
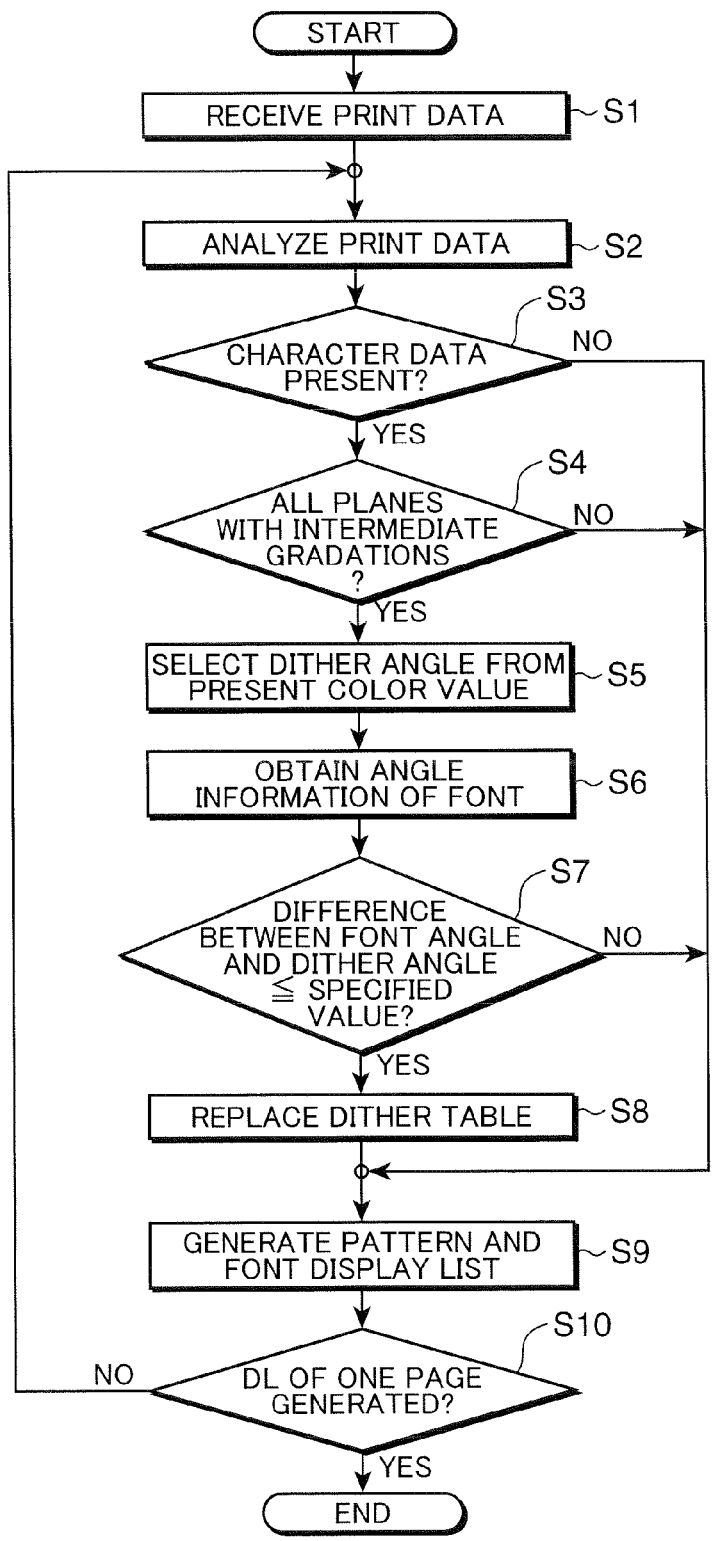
FIG. 5 is a flow chart showing the operation of the image forming apparatus according to the first embodiment.

FIG. 5 is a flow chart showing the operation of the image forming apparatus 10 according to the first embodiment. With reference to this flow chart, the operation of the image forming apparatus 10 is described.

Step S1: The print data receiver 11 receives print data.

Step S2: The print data analyzer 12 analyzes the print data.

Step S3: The print data analyzer 12 judges whether or not print data elements are character data based on the analysis result in Step S2. Step S4 follows if the print data elements are character data (YES in Step S3), whereas this routine skips to Step S9 unless otherwise (NO in Step S3).

Step S4: The jaggy judging section 134 judges whether or not all the planes (output planes for the respective CMYK toner colors) have intermediate gradations. Step S5 follows if all the planes have intermediate gradations (YES in Step S4), whereas this routine skips to Step S9 unless otherwise (NO in Step S4).

Step S5: The graphic processing section 132 selects the screen angle based on the present color value.

Step S6: The font information managing section 133 acquires the angle information of each font obtained beforehand.

Step S7: The graphic processing section 132 judges whether or not a difference between a font angle and the screen angle is equal to or below a specified value for all the planes. Step S8 follows if the angle difference is equal to or below the specified value (YES in Step S7), whereas this routine skips to Step S9 if the angle difference is above the specified value (NO in Step S7).

Step S8: The graphic processing section 132 replaces the dither table for the plane with the angle difference equal to or below the specified value by a dither table for the plane (see FIG. 3) having the screen angle with the maximum difference from the font angle.

Step S9: The intermediate language generating section 135 generates a display list using the dither table selected in Step S8 or a dither table of default (selects depending on the flow path).

Step S10: The intermediate language generating section 135 judges whether or not the generation of the display list (DL) of one page has been completed by completing the processing of the respective elements in one page.

The display list is generated by the above series of operations. Thereafter, the page rasterizer 16 decrypts the display list generated in Step S9 and generates rasterized data (output image) rasterized by the dither method. At this time, the page rasterizer 16 converts the data into the output image of intermediate gradation using a line screen generated by the dither method using the stripe pattern. The page rasterizer 16 transmits the rasterized data to the output unit 17, which then prints the rasterized data to complete the process.

Effects of the First Embodiment

The following is possible by the image forming apparatus 10 of the first embodiment.

By having the font angle as the attribute information, judgment as to whether or not jaggies will appear (character reproducibility will worsen) can be made at high speed.

If italic characters are set, judgment as to whether or not jaggies will appear can be made at ever higher speed by having the angle of italic faces as the attribute information of the character angle.

Since the dither table used to generate the intermediate gradation determining the color of the font is only replaced between the respective colors, jaggies on the edge parts of the respective characters can be easily reduced and, hence, image quality can be improved. Further, since only the processing of replacing the dither table is performed, time required for the processing is unchanged from before.

[Miscellaneous]

In the flow chart shown in FIG. 5, the method for replacing the dither table only in the case of characters is employed. However, even in the case of graphic data other than characters, such a method may be employed according to which the frequently appearing angle of line segments is obtained and a dither table is so selected that the frequently appearing angle does not approximate to the screen angle by the graphic processing section 132.

In the presence of italic characters, the processing may be performed using the angle of the italic faces as the frequently appearing angle (this also applies to other embodiments described later).

Although the image output apparatuses is the image forming apparatus in this embodiment, it may be a display apparatus such as a display (this also applies to other embodiments described later).

An image output program for executing the above-described process can be provided in the form of a program product storing this program in a computer-readable storage medium such as a ROM, a hard disk, a flexible disk, a memory card or a magneto-optical disk (this also applies to other embodiments described later). By importing this image output program from the storage medium to an electronic device, commands are given to the respective constituent parts of the electronic device, thereby causing the respective constituent parts to perform the processings.

Second Embodiment

In a second embodiment, the appearance of jaggies is suppressed by rotating dither tables set for the respective toner colors by 90° in the case where the appearance of jaggies is predicted for data containing characters.

A jaggy appearance detecting method is similar to the one described above in the first embodiment. Jaggies are judged to be likely to appear if an angle difference between a screen angle and a character angle is equal to or below a specified threshold value (e.g. equal to or below 30°). In this case, the appearance of jaggies is suppressed to a minimum level by using a dither table with a screen angle rotated by 90° from an originally set screen angle in the generation of a halftone pattern which will become the character color.

For example, characters having a Gray value of intermediate gradation given by black toner are assumed, wherein the angle of the characters is approximate to 45° (e.g. 50°) and the angle difference is equal to or below the threshold value (30° illustrated in the above example). In this case, since the screen angle of the black toner expressing Gray is 45° (see FIG. 3), many jaggies appear if the same screen angle is used. Accordingly, a dither pattern of 135° rotated by 90° from 45° is used as a screen angle for generating the intermediate gradation expressing the Gray value. Thus, there is an angle difference of 85° between the angle of the line segment (50°) and the screen angle (135°), wherefore jaggies can be made unnoticeable.

As described above, in the second embodiment, the appearance of jaggies is predicted based on the angle information of the character and is suppressed by rotating the screen angles determined for the respective toner colors by 90° for all the colors if such a prediction is made.

The functional construction of the image forming apparatus in this case is substantially the same as the one shown in FIG. 4. A point of difference is that the graphic processing section 132 rotates the screen angles of the line screens for all the colors by 90° when jaggies are judged to appear by the jaggy judging section 134.

Figure 6:
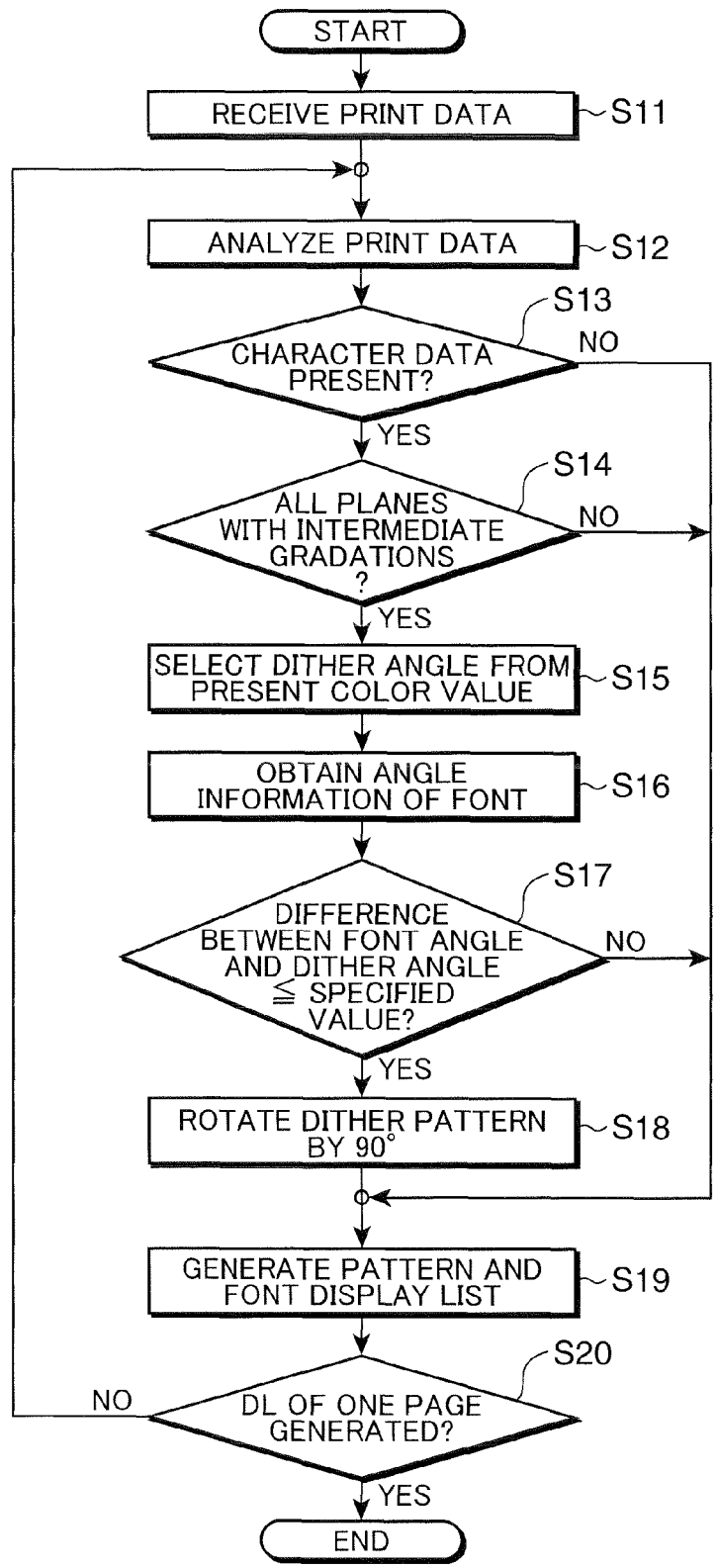
FIG. 6 is a flow chart showing the operation of an image forming apparatus according to a second embodiment.

FIG. 6 is a flow chart showing the operation of the image forming apparatus according to the second embodiment. Since the processings in Steps 11 to 20 of this flow chart except Step S18 are the same as those in Steps S1 to S10 of the flow chart of FIG. 5 except Step S8, these steps are not described here.

In the processing flow of the second embodiment, in Step S18, the graphic processing section 132 rotates the dither tables for the planes of all the colors by 90°. Accordingly, in Step S19, a display list is generated according to the dither tables rotated by 90° or a dither pattern of default (changes depending on the flow path).

According to the second embodiment, since the dither patterns of all the planes determining the font color are rotated, the jaggies on the edge parts can be reduced according to the respective characters with the color of a character string kept uniform and, hence, image quality can be improved. Even if the dither tables are rotated by 90°, the subsequent processing time is unchanged from the case where the dither tables are not rotated by 90°. Since the halftone patterns of all the planes are equally rotated by 90°, there is no likelihood of the appearance of moire patterns between the respective planes.

Third Embodiment

In a third embodiment, the appearance of jaggies is suppressed by rotating a sheet output direction by 90° in the case where the appearance of jaggies is predicted for data containing characters. Specifically, if a first sheet and a second sheet whose output image recording directions differ by 90° are selectable as a sheet to have an output image recorded thereon in an image forming apparatus, the second sheet is selected as a sheet to have the output image recorded thereon in the case where the appearance of jaggies is predicted with the recording direction of the first sheet. The orientation of the image is also rotated by 90° in conformity with the recording direction of the second sheet.

[Rotation of Sheet Output Direction to Suppress the Appearance of Jaggies]

Figure 7B:
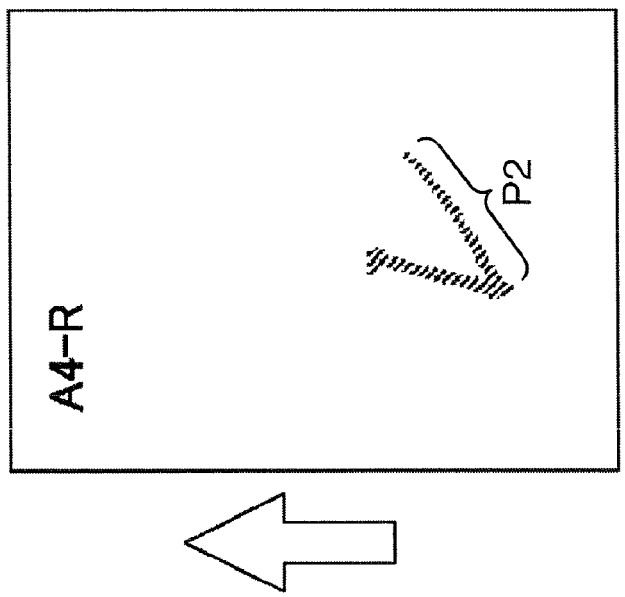
FIG. 7B is a diagram showing a state where the appearance of jaggies is suppressed by rotating the orientation of the sheet by 90°.
Figure 7A:
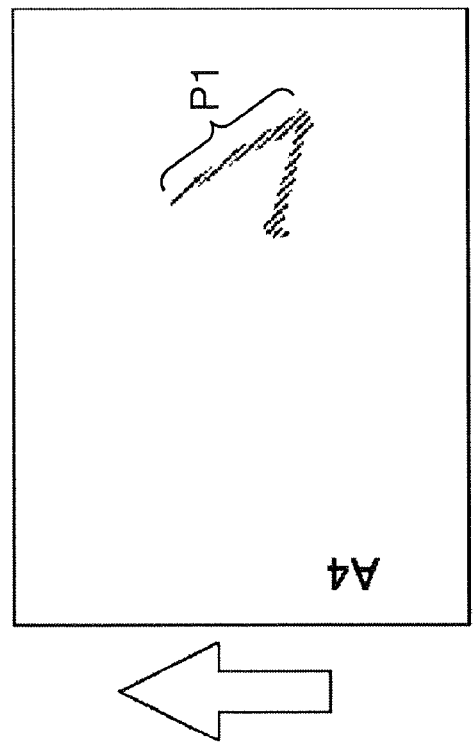
FIG. 7A is a diagram showing a state where jaggies appear in an image outputted to a sheet.

FIG. 7A shows an example in which, upon displaying a katakana character "RE" outputted to an A4-sheet using a mono-color line screen, jaggies are noticeable since an oblique stroke P1 of "RE" is approximate to a screen angle.

FIG. 7B is an output diagram of an image of the katakana character "RE" in the case of an output on an A4-sheet fed from a sheet cassette generally called "A4-R" in which sheets are arranged in an orientation rotated by 90° with respect to the above A4 sheet. Arrows in FIGS. 7A, 7B indicate sheet output directions. "RE" in FIG. 7A and "RE" in FIG. 7B are both expressed by intermediate color images using line screens with the same screen angle of 45° to the sheet output directions. As a result of rotating the original "RE" image by 90° in conformity with the output sheet in FIG. 7B, it can be understood that the jaggy phenomenon of the oblique stroke is suppressed.

[Judgment on Jaggy Appearance]

Figure 8:
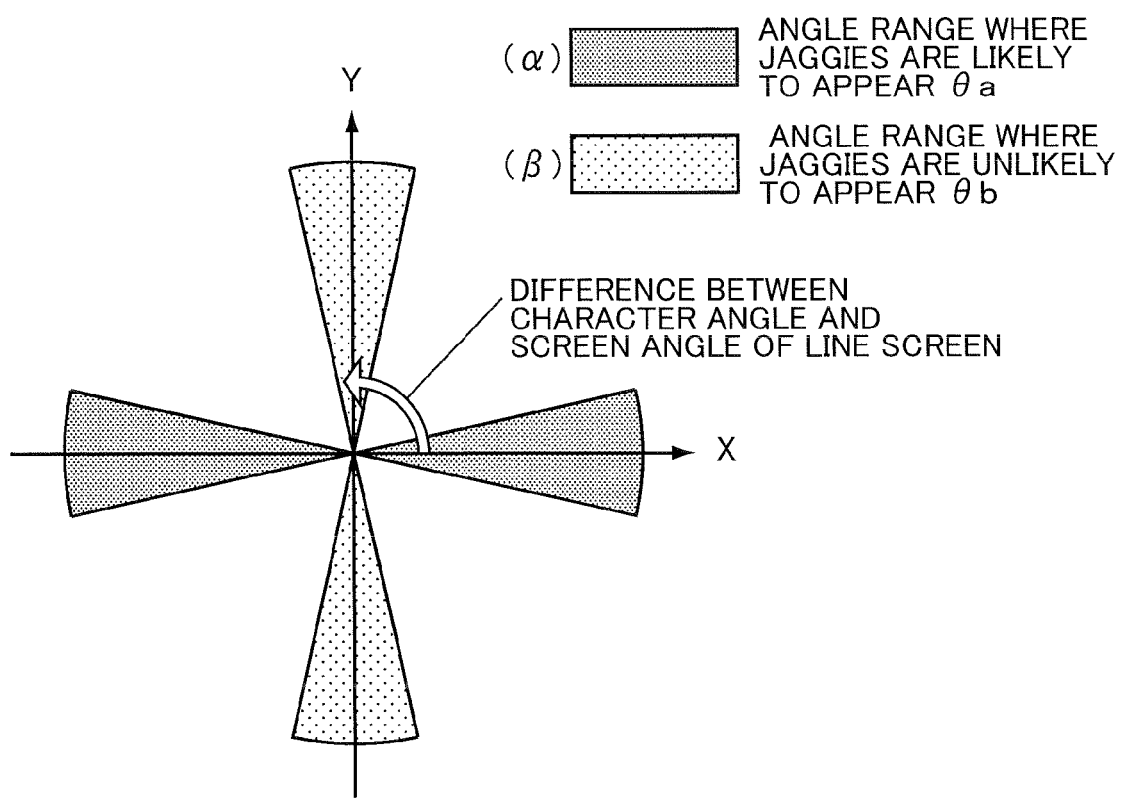
FIG. 8 is a diagram showing an angular range where jaggies are judged to be likely to appear and an angular range where jaggies are judged to be unlikely to appear.

FIG. 8 is a diagram showing a jaggy appearance judgment method according to the third embodiment. A basic part of a jaggy appearance judgment is the same as in the first embodiment, but a counting method is employed here.

FIG. 8 shows an angle range (α) where jaggies are likely to appear due to a difference between a screen angle and the angle of a character element and an angle range (β) where jaggies are unlikely to appear in the case where the screen angle of a line screen is parallel to an x-axis of FIG. 8. If a difference between the screen angle and the angle of a line segment of a character extracted by an element angle extracting section for each character is an acute angle lying in an angle range θa as seen in (α) of FIG. 8, it is judged that jaggies are likely to appear. If this difference lies in an angle range θb approximate to a right angle as seen in (β) of FIG. 8, it is judged that jaggies are unlikely to appear.

Upon judging the jaggy appearance, a jaggy appearing character counter is incremented if an angle difference between the screen angle and the angle of the line segment of each of characters appearing in image data lies in the range θa while being decremented if the angle difference between the screen angle and the angle of the line segment lies in the range θb. If the value of the jaggy appearing character counter is positive after the judgment of all the characters is finally completed, it is judged to rotate a sheet by 90°. The flow of the more detailed operation is described with reference to a flow chart to be described later.

If it is judged that jaggies are likely to appear, a sheet fed with its orientation rotated by 90° with respect to the sheet set at the time of judgment (sheet having an output image recording direction differed by 90°) is selected as a sheet for image recording. Further, the image data is generated with a rotation of 90° in conformity with the sheet rotated by 90°.

The screen angle of the line screen is set at a specific angle to a sheet feeding direction. Thus, the angle of the line screen with respect to the image data on the sheet is rotated by 90° in an opposite rotating direction by selecting the sheet fed with its orientation rotated by 90° and rotating the image data by 90°. As a result, the jaggy phenomenon can be suppressed.

[Apparatus Construction]

Figure 9:
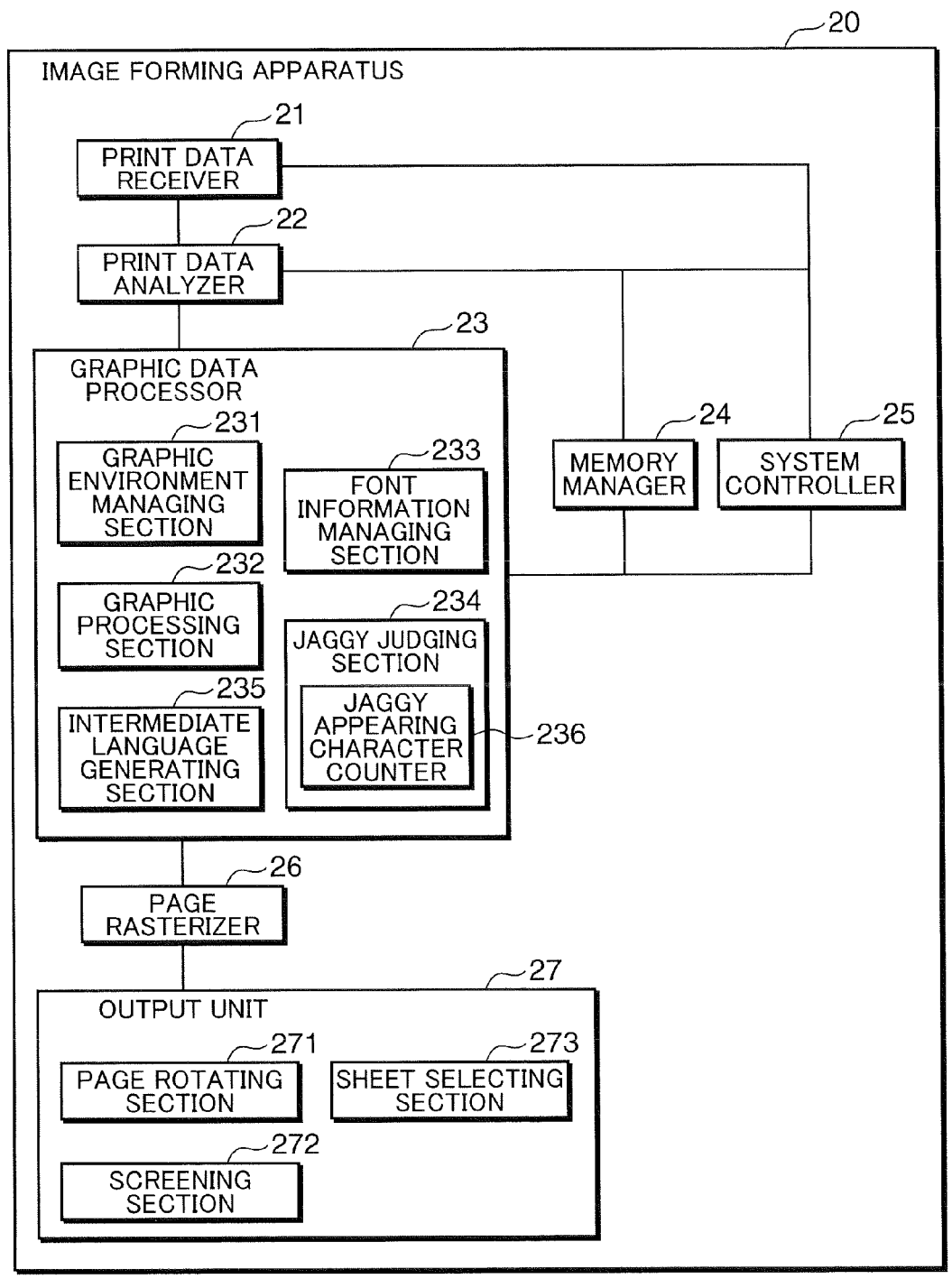
FIG. 9 is a functional block diagram of an image forming apparatus according to a third embodiment.

FIG. 9 is a functional block diagram of an image forming apparatus 20 according to the third embodiment. The image forming apparatus 20 is provided with a print data receiver 21, a print data analyzer 22, a graphic data processor 23, a memory manager 24, a system controller 25, a page rasterizer 26 (image conversion unit) and an output unit 27.

The graphic data processor 23 is functionally provided with a graphic environment managing section 231, a graphic processing section 232, a font information managing section 233 (element angle storing unit), a jaggy judging section 234 (jaggy judging unit) and an intermediate language generating section 235. The respective functional parts are described below.

The print data receiver 21 receives print data (image data) transmitted from an unillustrated PC (Personal Computer).

The print data analyzer 22 analyzes the data to be converted into an intermediate language (display list) by analyzing the content of the print data written in a page description language. The print data analyzer 22 also judges whether or not the respective elements are character data or whether or not the respective planes (output planes for the respective toners) are outputs containing intermediate colors.

The graphic data processor 23 processes graphic data for suppressing the appearance of jaggies.

The graphic environment managing section 231 manages configuration information on graphics such as set matrices for size enlargement and reduction, presently effective colors and dither tables.

The graphic processing section 232 processes complicated graphics into simple graphic primitives after the print data analyzer 22 analyzes the print data.

The font information managing section 233 stores the attribute information of characters to be imaged, i.e. normal font information, and the most frequent angle data of the font described above or information on the angle of italic faces used in italic characters.

The jaggy judging section 234 judges whether or not jaggies are likely to appear based on the color, the attribute information of the characters and the screen angle. Further, the jaggy judging section 234 is internally provided with a jaggy appearing character counter 236, judges whether or not jaggies are likely to occur based on the angle difference between the screen angle and the angle in the attribute information for each character, and increments or decrement the value of the jaggy appearing character counter 236 in accordance with the judgment. As described above, the value of the jaggy appearing character counter 236 is incremented if the angle difference lies in the range θa (see FIG. 8) while being decremented if the angle difference lies in the range θb.

The intermediate language generating section 235 generates a display list (intermediate language) based on the information processed by the graphic processing section 232.

The memory manager 24 manages memories of a system. The system controller 25 manages the common information of the system to control the system.

The page rasterizer 26 decrypts the display list generated by the intermediate language generating section 235 to rasterize one page. At this time, the page rasterizer 26 converts the data into an output image of intermediate gradation using a line screen generated by the dither method using a stripe pattern.

The output unit 27 has a print engine as a printing mechanism, and actually prints an image on a recording medium (generally paper sheet, OHP sheet, or the like). The output unit 27 includes a page rotating section 271, a screening section 272 and a sheet selecting section 273.

The page rotating section 271 rotates a page image in conformity with the output sheet. When the jaggy judging section 234 predicts the jaggy appearance, the sheet selecting section 273 to be descried later selects the sheet cassette accommodating sheets having the orientation thereof rotated by 90° instead of the presently selected sheet cassette, and the page rotating section 271 rotates the page image by 90° in conformity with the orientation of the sheet.

The screening section 272 performs a screening process for converting a continuous gradation image into a binary or multivalued image that can be outputted by a device.

The sheet selecting section 273 selects from which of a plurality of sheet cassettes provided in the image forming apparatus 20 a sheet to have an image transferred thereto is to be fed. The sheet selecting section 273 selects the sheet cassette accommodating the sheets having the orientation thereof rotated by 90° instead of the presently selected sheet cassette when the appearance of jaggies is judged by the jaggy judging section 234.

[Flow Chart]

Figure 10:
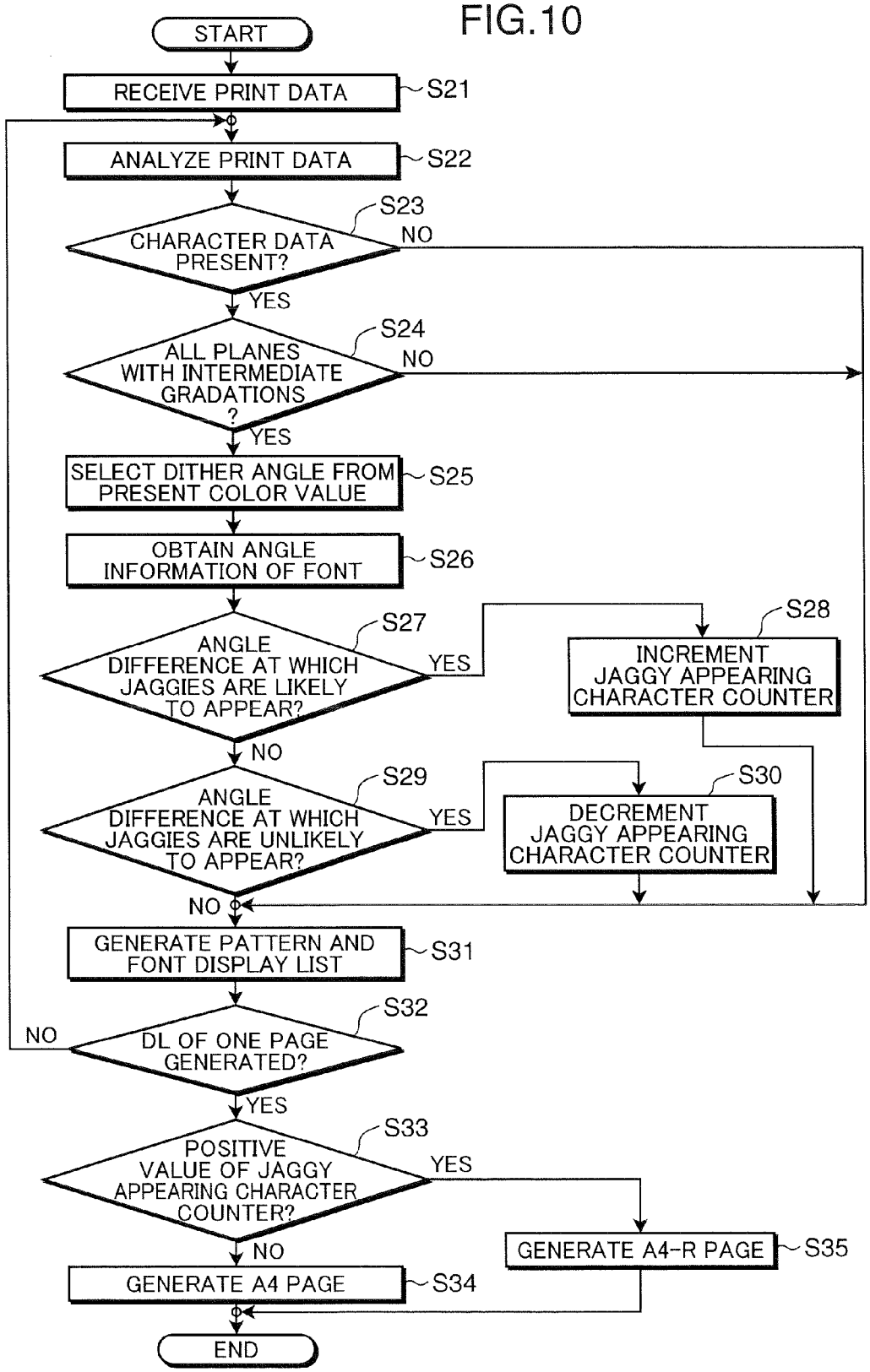
FIG. 10 is a flow chart showing the operation of the image forming apparatus according to the third embodiment.

FIG. 10 is a flow chart showing the operation of the image forming apparatus 20 according to the third embodiment. With reference to this flow chart, the operation of the image forming apparatus 20 is described.

Step S21: The print data receiver 21 receives print data.

Step S22: The print data analyzer 22 analyzes the print data.

Step S23: The print data analyzer 22 judges whether or not print data elements are character data based on the analysis result in Step S22. Step S24 follows if the print data elements are character data (YES in Step S23), whereas this routine skips to Step S31 unless otherwise (NO in Step S23).

Step S24: The jaggy judging section 234 judges whether or not all the planes (output planes for the respective CMYK toner colors) have intermediate gradations. Step S25 follows if all the planes have intermediate gradations (YES in Step S24), whereas this routine skips to Step S31 unless otherwise (NO in Step S24).

Step S25: The graphic processing section 232 selects the screen angle (dither angle) based on the present color value.

Step S26: The font information managing section 233 acquires the angle information of each font obtained beforehand.

Step S27: The jaggy judging section 234 judges whether or not an angle difference between the font angle information and the screen angle lies in the angle range θa (see FIG. 8) where jaggies are likely to appear. Step S28 follows if the angle difference lies in the angle range θa (YES in Step S27), whereas this routine skips to Step S29 unless otherwise (NO in Step S27).

Step S28: The jaggy judging section 234 increments the value of the jaggy appearing character counter 236 by one unit.

Step S29: The jaggy judging section 234 judges whether or not the angle difference between the font angle information and the screen angle lies in the angle range θb (see FIG. 8) where jaggies are unlikely to appear. Step S30 follows if the angle difference lies in the angle range θb (YES in Step S29), whereas this routine skips to Step S31 unless otherwise (NO in Step S29).

Step S30: The jaggy judging section 234 decrements the value of the jaggy appearing character counter 236 by one unit.

Step S31: The intermediate language generating section 235 generates a pattern and a display list of the font.

Step S32: The intermediate language generating section 235 judges whether or not the generation of the display list (DL) of one page has been completed by completing the processing of the respective elements in one page. Step S33 follows if the generation of the display list has been completed, whereas this routine returns to Step S22 to repeat the operation from the data analysis on unless otherwise (NO in Step S32).

Step S33: The jaggy judging section 234 judges whether or not the value of the jaggy appearing character counter 236 is positive. Step S34 follows in the case of a negative value (NO in Step S33), whereas this routine skips to Step S35 in the case of a positive value (YES in Step S33).

Step S34: The sheet selecting section 273 selects an A4 sheet of normal orientation since the jaggy appearance is judged to be unlikely with the present screen angle set. Then, the image data is screened by the screening section 272, and the image is outputted to the A4 sheet by the output unit 27.

Step S35: The sheet selecting section 273 selects an A4-R sheet having the orientation rotated by 90° from that of normal A4 sheets since the jaggy appearance is judged to be likely with the present screen angle set. Further, the page rotating section 271 rotates the page (image data) in conformity with the A4-R orientation. Subsequently, this image data is screened by the screening section 272, and the image is outputted to the A4-R sheet by the output unit 27.

Effects of the Third Embodiment

The following is enabled by the image forming apparatus 20 of the third embodiment.

The jaggy appearance is judged for each of all the characters in the image data, the judgment result is recorded in the jaggy appearing character counter 236, and judgment is made based on the count value of the jaggy appearing character counter 236 after completing the judgments of all the characters. Thus, the appearance of jaggies can be performed at very high speed.

Jaggies can be suppressed by a simple method of selecting a sheet (e.g. A4-R) fed with the orientation thereof rotated by 90° with respect to the presently selected sheet (e.g. A4) as a sheet to have the page image recorded thereon.

By having the font angle as the attribute information, judgment as to whether or not jaggies will appear (character reproducibility will worsen) can be performed at high speed.

An output can be made in a printing direction optimal for characters contained in a document on a page-by-page basis or a document-by-document basis.

If italic characters are set, the jaggy appearance can be judged at even higher speed utilizing the angle of italic faces as the attribute information of the character angle.

As the sheet rotated by 90° is selected, the dither patterns of all the planes determining the font color are also rotated by 90° in the case of a color image forming apparatus. Thus, the jaggies on the edge parts can be reduced according to the respective characters with the color of a character string kept uniform and, hence, image quality can be improved. Further, since it is sufficient to change the orientation of the sheet by 90°, it is not necessary to generate dither tables for the line screens of the respective toner colors anew, therefore requiring no extra calculation time for such image processing. In other words, it is sufficient only to rotate the image data by 90°, thereby enabling the processing within a shorter period of time.

[Miscellaneous]

In the flow chart shown in FIG. 10, the method for judging the appearance of jaggies only in the case of characters is employed. However, even in the case of graphic data other than characters, such a method may be employed according to which the graphic processing section 232 obtains the frequent appearing angle of the line segments for judgment on the appearance of jaggies and a sheet is rotated by 90° if jaggies will appear.

In the third embodiment, the monochromatic image is described, but application to color images is similarly possible. In a color image forming apparatus, images are generally formed using four toners (cyan (C), magenta (M), yellow (Y) and black (K)). Judgment as to whether or not the orientation of a sheet should be changed may be made based on judgment on the jaggy appearance for toner colors having intermediate gradations and, in the case of a jaggy phenomenon, making the jaggy phenomenon markedly noticeable due to the color characteristics thereof (in fact, jaggies are marked in the order of black, magenta, cyan and yellow). Alternatively, the appearance of jaggies may be judged for the screen angle of the most frequently used toner color. Further, the toner color making the jaggy phenomenon most marked may be determined based on both the markedness of each toner color and the appearance ratio of each toner color and jaggy judgment may be made on the basis of this toner color.

In this embodiment, an A4-R sheet having an orientation rotated by 90° is selected if an A4 sheet is set. If sheet default setting is A4-R, an A4 sheet having an orientation rotated by 90° may be selected if the jaggy appearance is predicted. Of course, the sheet size is not limited to A4, and sheets of A5 or B-standards such as B4 and B5 or letters may be used.

Fourth Embodiment

In the third embodiment, a sheet having an orientation rotated by 90° is selected if jaggies are judged to appear. In a fourth embodiment, the screen angle of a line screen is rotated by 90° if jaggies are judged to appear. A jaggy appearance judgment method is similar to the one of the third embodiment described above.

[Apparatus Construction]

Figure 11:
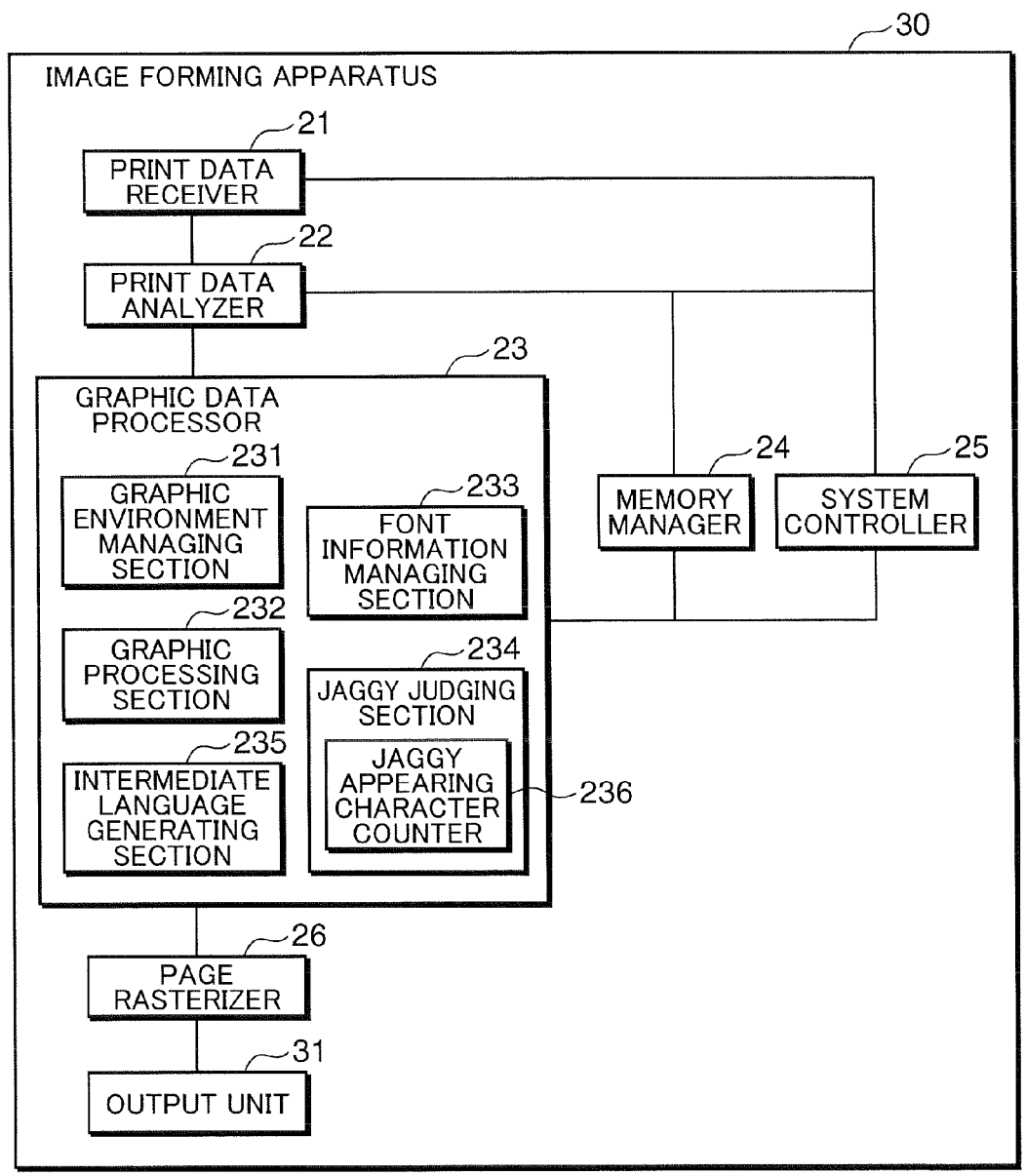
FIG. 11 is a functional block diagram of an image forming apparatus according to a fourth embodiment.

FIG. 11 is a functional block diagram of an image forming apparatus 30 according to the fourth embodiment. The same parts as those of the image forming apparatus 20 of FIG. 9 are identified by the same reference numerals. Since the image forming apparatus 20 of the third embodiment and the image forming apparatus 30 of this embodiment are substantially identical in construction, only points of difference are described.

An output unit 31 of the image forming apparatus 30 includes none of the page rotating section 271, the screening section 272 and the sheet selecting section 273, which are provided in the image forming apparatus 20, but includes a print engine as a printing mechanism, i.e. has only a print output function of actually printing an image on a recording medium (generally paper sheet, OHP sheet, or the like).

The graphic processing section 232 (screen angle setting unit) has a function for setting the screen angles of the line screens of all the toner colors by 90° when jaggies are judged to appear by the jaggy judging section 234 in addition to a function of processing complicated graphics into simple graphic primitives after the print data analyzer 22 analyzes print data.

[Flow Chart]

Figure 12:
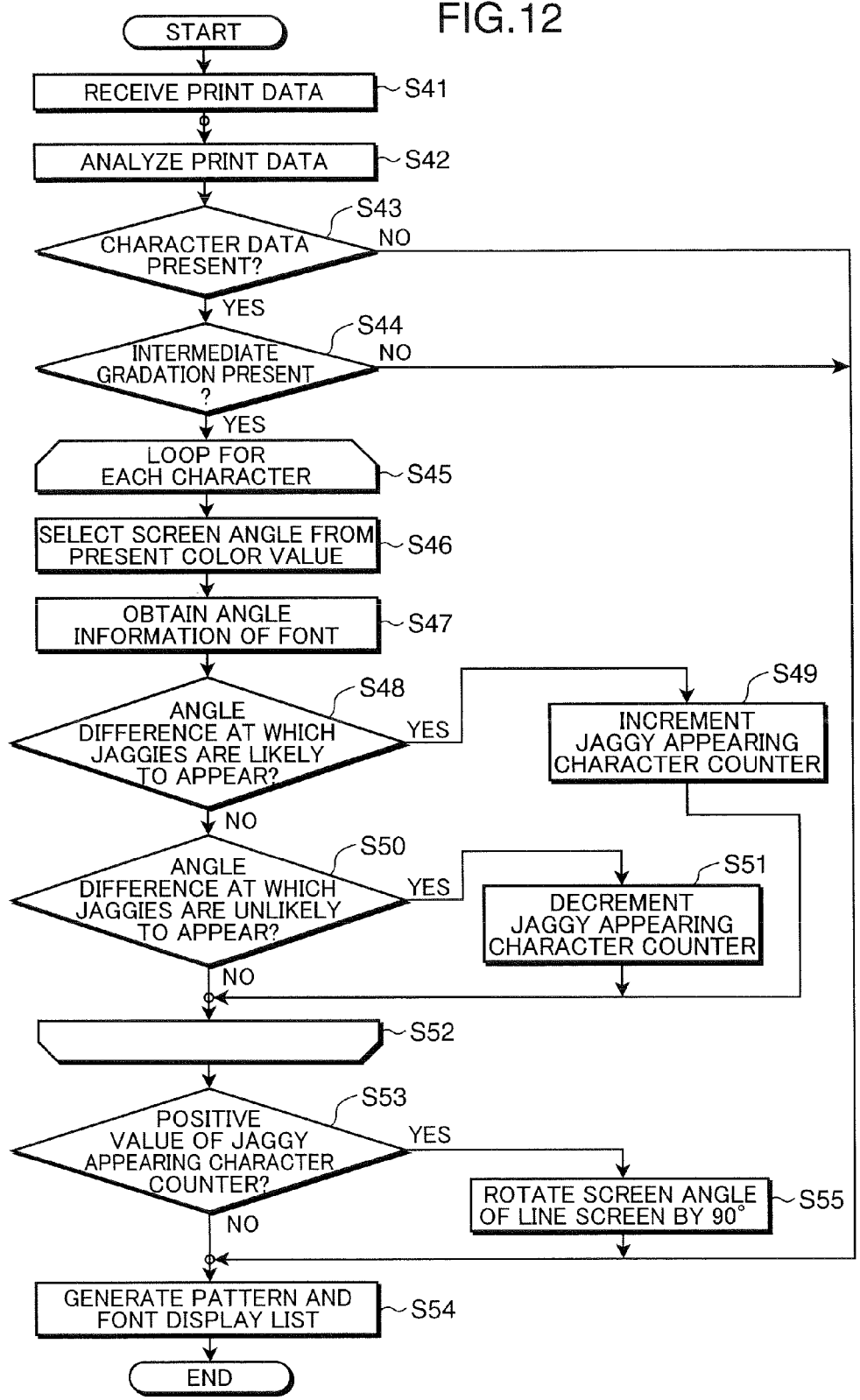
FIG. 12 is a flow chart showing the operation of the image forming apparatus according to the fourth embodiment.

FIG. 12 is a flow chart showing the operation of the image forming apparatus 30 according to the fourth embodiment. With reference to this flow chart, the operation of the image forming apparatus 30 is described.

Step S41: The print data receiver 21 receives print data.

Step S42: The print data analyzer 22 analyzes the print data.

Step S43: The print data analyzer 22 judges whether or not print data elements are character data based on the analysis result in Step S42. Step S44 follows if the print data elements are character data (YES in Step S43), whereas this routine skips to Step S55 unless otherwise (NO in Step S43).

Step S44: The jaggy judging section 234 judges whether or not any intermediate gradation is present in the character data. Step S45 follows if the intermediate gradation is present (YES in Step S44), whereas this routine skips to Step S55 unless otherwise (NO in Step S44).

Step S45: Step S45 is paired with Step S52 to form a loop. For all the characters in the page data, a processing in the loop is repeated while treating each character as a target character.

Step S46: The graphic processing section 232 selects the screen angle of the default corresponding to the color of each plane.

Step S47: The font information managing section 233 acquires the angle information of the font of the target character from the font information obtained beforehand.

Step S48: The jaggy judging section 234 judges whether or not an angle difference between the font angle information and the screen angle lies in the angle range θa (see FIG. 8) where jaggies are likely to appear. Step S49 follows if the angle difference lies in the angle range θa (YES in Step S48), whereas this routine skips to Step S50 unless otherwise (NO in Step S48).

Step S49: The jaggy judging section 234 increments the value of the jaggy appearing character counter 236 by one unit.

Step S50: The jaggy judging section 234 judges whether or not the angle difference between the font angle information and the screen angle lies in the angle range θb (see FIG. 8) where jaggies are unlikely to appear. Step S51 follows if the angle difference lies in the angle range θb (YES in Step S50), whereas this routine skips to Step S52 unless otherwise (NO in Step S50).

Step S51: The jaggy judging section 234 decrements the value of the jaggy appearing character counter 236 by one unit.

Step S52: Step S52 is paired with Step 45 and an exit from the loop occurs to proceed to Step S53 if there is no more character data on the page. Return is made to Step S45 to repeat the loop if there still remains any character data on the page.

Step S53: The jaggy judging section 234 judges whether or not the value of the jaggy appearing character counter 236 is positive. Step S54 follows in the case of a negative value (NO in Step S53), whereas this routine skips to Step S55 in the case of a positive value (YES in Step S53).

Step S54: The graphic processing section 232 rotates the screen angle of the line screen by 90° by rotating the dither table by 90° since the jaggy appearance is judged to be likely with the default screen angle set. This rotation processing is performed for the planes of all the colors in the case of a color image.

Step S55: The intermediate language generating section 235 generates a pattern and a display list of the font.

The display list is generated by the above series of operations. Thereafter, the page rasterizer 26 decrypts the display list generated in Step S55 and generates rasterized data (output image) rasterized by the dither method. At this time, the page rasterizer 26 converts the data into the output image of intermediate gradation using the line screen generated by the dither method using the stripe pattern. The page rasterizer 26 transmits the rasterized data to the output unit 31, which then prints the rasterized data to complete the process.

According to the image forming apparatus 30 of the fourth embodiment, by rotating the dither patterns of all the planes determining the font color, the jaggies on the edge parts can be reduced according to the respective characters with the color of a character string kept uniform and, hence, image quality can be improved. Even if the dither tables are rotated by 90°, a subsequent processing time is unchanged from the case where the dither tables are not rotated by 90°. Further, since the halftone patterns of all the planes are equally rotated by 90°, there is no likelihood of the appearance of moire patterns between the respective planes.

In the flow chart of FIG. 12, the image processing of the data of one page is described. In the case of processing data of a plurality of pages, the process after Step S42 may be repeated.

Fifth Embodiment

In an image forming apparatus of a fifth embodiment, an angular distribution of line segments of each of all the characters present in page data is obtained, integrated and recorded based on the angle information of the font. Then, an optimal screen angle is determined based on the integration data of the angular distributions of the line segments of all the characters.

[Apparatus Construction]

Figure 13:
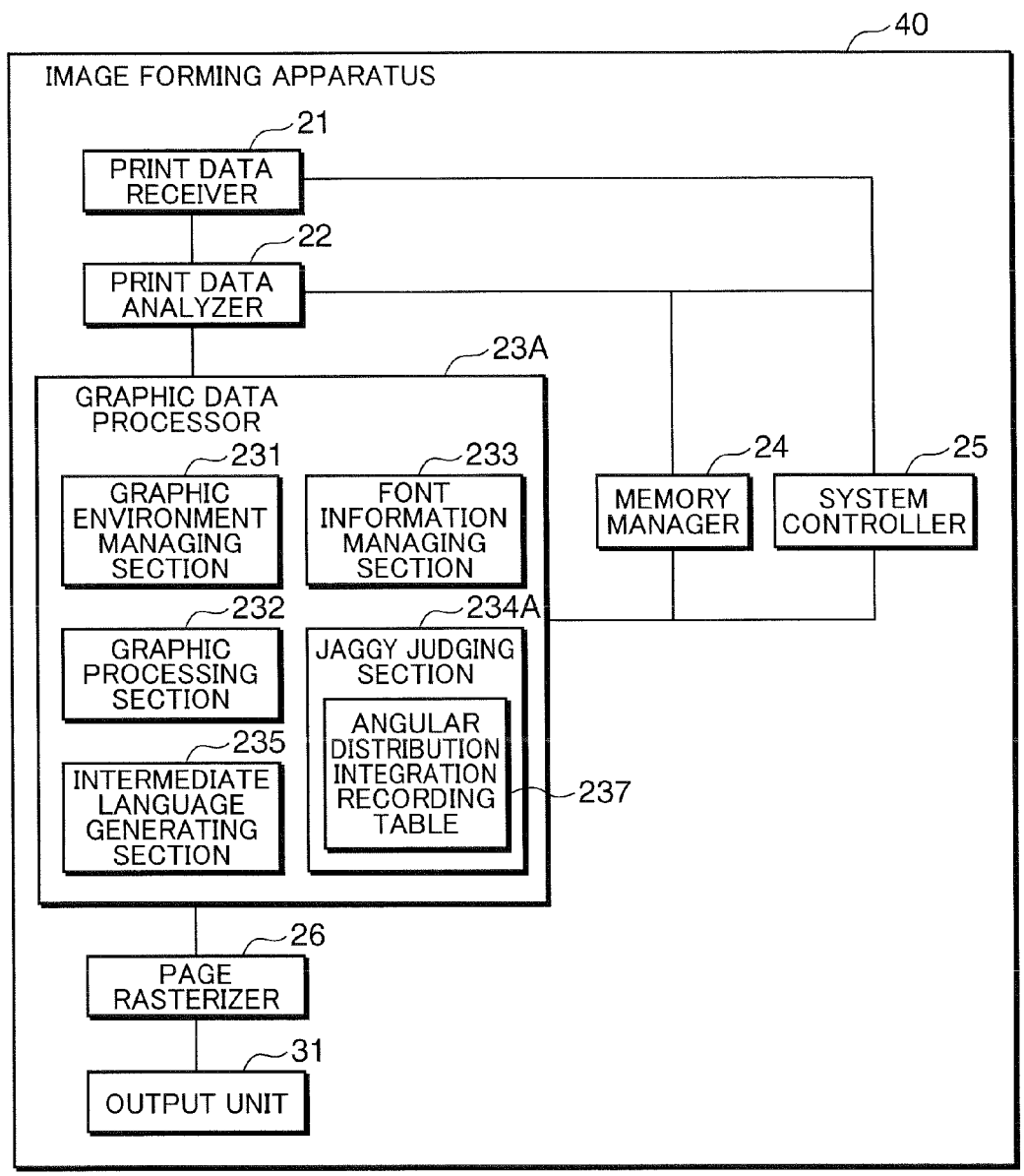
FIG. 13 is a functional block diagram of an image forming apparatus according to a fifth embodiment.

FIG. 13 is a functional block diagram of an image forming apparatus 40 according to a fifth embodiment. The same parts as those of the image forming apparatus 20 of FIG. 9 are identified by the same reference numerals. Since the image forming apparatus 30 of the fourth embodiment and the image forming apparatus 40 of this embodiment are substantially identical in construction, only points of difference are described.

A jaggy judging section 234A includes an angular distribution integration recording table 237 instead of the jaggy appearing character counter 236 of the fourth embodiment. A font information managing section 233 breaks each font into line segment elements and stores data on the angular distribution of each line segment as angular distribution information.

The angular distribution integration recording table 237 is a table for recording the angular distribution of the line segments of each character font for each character in page data based on each font information and for integrating and recording the data for each character.

When the recording of the angular distributions of all the characters in the angular distribution integration recording table 237 is completed, the graphic processing section 232 selects an angle with the least jaggy appearance as the screen angle of the line screen based on the angular distributions of the angular distribution integration recording table 237.

In the case of a color image, the angular distribution integration recording table 237 is generated for each toner color. The line screen angle for the plane of each toner color is selected in consideration of the angular distributions of the angular distribution integration recording table 237 and a condition that the line screen for each plane forms no moire pattern.

[Flow Chart]

Figure 14:
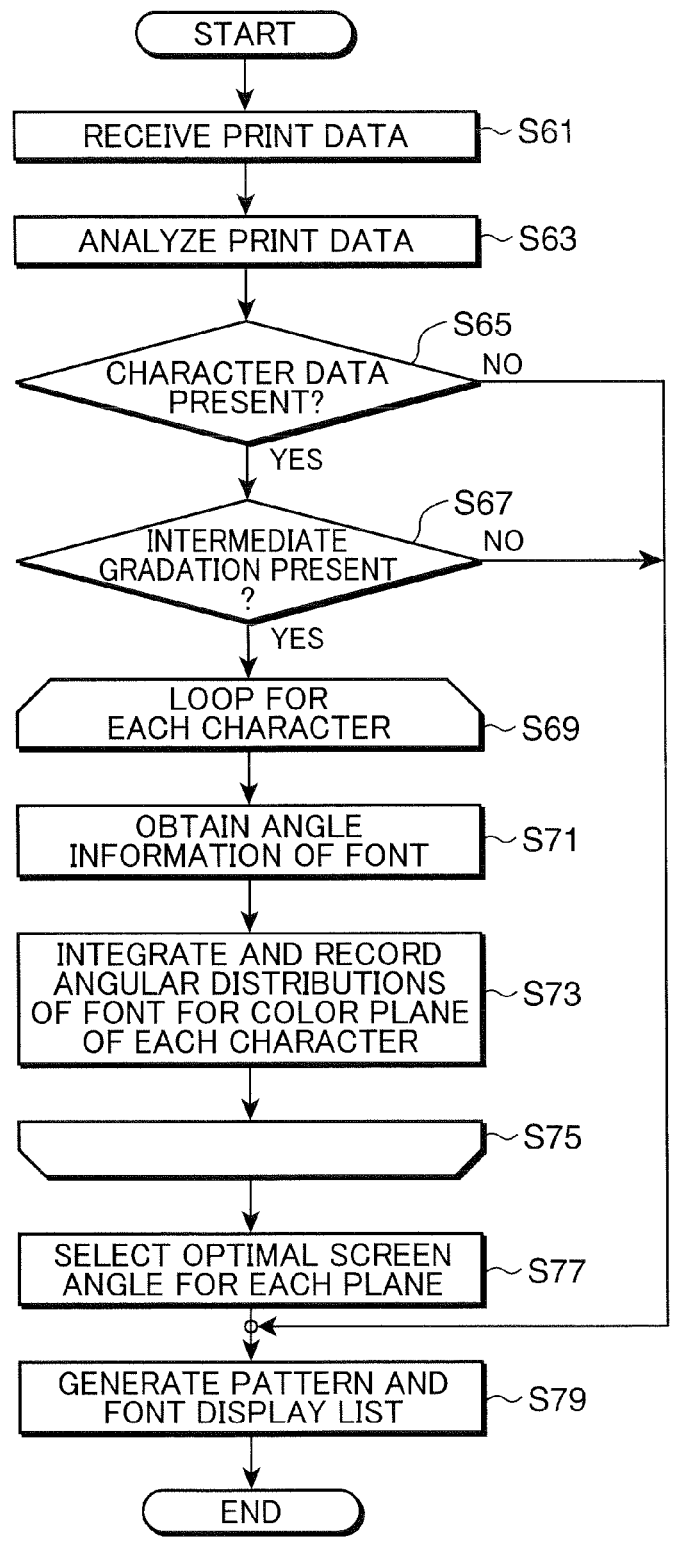
FIG. 14 is a flow chart showing the operation of the image forming apparatus according to the fifth embodiment.

FIG. 14 is a flow chart showing the operation of the image forming apparatus 40 according to the fifth embodiment. With reference to this flow chart, the operation of the image forming apparatus 40 is described.

Step S61: The print data receiver 21 receives print data.

Step S63: The print data analyzer 22 analyzes the print data.

Step S65: The print data analyzer 22 judges whether or not print data elements are character data based on the analysis result in Step S63. Step S67 follows if the print data elements are character data (YES in Step S65), whereas this routine skips to Step S79 unless otherwise (NO in Step S65).

Step S67: The jaggy judging section 234A judges whether or not any intermediate gradation is present in the character data. Step S69 follows if the intermediate gradation is present (YES in Step S67), whereas this routine skips to Step S79 unless otherwise (NO in Step S67).

Step S69: Step S69 is paired with Step S75 to form a loop. For all the characters in the page data, a processing in the loop is repeated while treating each character as a target character.

Step S71: The font information managing section 233 acquires the angle information of the font of the target character from the font information obtained beforehand.

Step S73: The jaggy judging section 234A records the angular distribution of the line segments of the font from the angle information of the font of the target character obtained in Step S71.

Step S75: Step S75 is paired with Step 69 and an exit from the loop occurs to proceed to Step S77 if there is no more character data on the page. Return is made to Step S69 to repeat the loop if there still remains any character data on the page.

Step S77: The jaggy judging section 234A determines the screen angle of the line screen at which jaggies are most unlikely to appear based on the angular distributions recorded in the angular distribution integration recording table 237. In the case of a color image, the jaggy judging section 234A determines the screen angles in consideration of the recording result of the angular distribution integration recording table 237 and the condition that the line screen for each plane forms no moire pattern.

Step S79: The intermediate language generating section 235 generates a pattern and a display list of the font.

The display list is generated by the above series of operations. Thereafter, the page rasterizer 26 decrypts the display list generated in Step S79 and generates rasterized data (output image) rasterized by the dither method. At this time, the page rasterizer 26 converts the data into the output image of intermediate gradation using the line screen generated by the dither method using the stripe pattern. The page rasterizer 26 transmits the rasterized data to the output unit 31, which then prints the rasterized data to complete the process.

According to the image forming apparatus 40 of the fifth embodiment, the angular distribution of the line segments of the font is integrated character by character for all the characters in the image data and the optimal screen angle of the line screen is selected from the result of the integrated angular distributions after completing the judgment on all the characters. Accordingly, judgment is made based on all the line segment elements contained in the font of the appearing characters, wherefore the screen angle for accurately suppressing jaggies can be selected. In the case of a color image, it is possible to select an optimal screen angle for suppressing both the jaggy appearance and the moire formation by additionally considering moires between the planes of different toner colors.

In the flow chart of FIG. 14, the image processing of the data of one page is described. In the case of processing data of a plurality of pages, the process after Step S63 may be repeated.

The present invention can be summarized as follows from the above respective embodiments.

An image output apparatus according to one aspect of the present invention comprises an image conversion unit that converts image data into an output image of intermediate gradation using a line screen for forming pixel points in stripes; an element angle storing unit that stores the angle information of line segments of the image data; a jaggy judging unit that judges whether or not jaggies will appear on the outline of the output image based on the angle information of the line segments stored in the element angle storing unit; and a screen angle setting unit that substantially changes the screen angle of the line screen if jaggies are judged to appear by the jaggy judging unit.

According to this construction, an image with suppressed jaggies can be outputted since the screen angle is substantially changed if the jaggy appearance is predicted upon expressing the intermediate gradation by a dither method using a line screen.

In the above construction, the screen angle setting unit preferably sets the screen angle of the line screen such that an angle difference between the angle of the line segments of the image data and the screen angle of the line screen is an angle difference at which jaggies appearing on the outline of the output image can be substantially suppressed.

According to this construction, the jaggies can be suppressed by a short-lasting processing since the jaggies are suppressed by suitably adjusting the screen angle with respect to the angle of the line segments of the image data if the jaggy appearance is predicted.

In the above construction, the jaggy judging unit preferably judges the jaggy appearance if the angle difference between the angle of the line segments stored in the element angle storing unit and the screen angle of the line screen is equal to or below a specified threshold value. According to this construction, whether or not jaggies will appear can be easily judged based on the threshold value.

In the above construction, the element angle storing unit preferably stores the angle information on the line segments of the character font of the image data or the italic angle information of italic characters.

In the above construction, it is preferable that the image data includes a plurality of color elements; that the element angle storing unit stores the angle information of the line segments for each color element; and that the screen angle setting unit sets the screen angle such that the angle difference between the screen angle of the line screen for each color element and the angle of the line segments for each color element is equal to or above a specified threshold value. According to this construction, the appearance of jaggies can be suppressed in the case of outputting a color image.

In this case, the screen angle setting unit preferably selects the screen angle of the line screen for each color element from a plurality of screen angles of the line screen set beforehand. According to this construction, since it is sufficient to select a suitable one from the screen angles set beforehand, the processing can be performed at higher speed.

If a first screen angle is set for a first color element and a second screen angle is set for a second color element in the case of outputting a color image, the screen angle setting unit preferably changes the screen angle of the first color element from the first screen angle to the second screen angle when the jaggy judging unit judges that jaggies will appear in an image relating to the first color element while judging that jaggies will not appear in an image relating to the second color element. According to this construction, since it is sufficient to select a suitable one from the screen angles set beforehand, the processing can be performed at higher speed.

In the above construction, the screen angle setting unit preferably rotates the screen angle of the line screen by 90° in a direction to suppress a jaggy phenomenon. According to this construction, since it is sufficient to rotate the screen angle by a predetermined angle of 90°, the processing can be performed at higher speed.

In this case, it is preferable that the image data includes a plurality of color elements; that the element angle storing unit stores the angle information of the line segments for each color element; and that the screen angle setting unit can rotate the screen angles of all the line screens for the respective color elements by 90°.

According to this construction, since the screen angles of all the line screens are rotated, jaggies on edge parts can be reduced according to the respective characters with the color of a character string kept uniform and, hence, image quality can be improved. Further, since the screen angles for all the color elements are equally rotated by 90°, there is no likelihood of forming moire patterns between the respective colors.

In the above construction, if a first sheet and a second sheet having different output image recording directions can be selected as a sheet to have an output image recorded thereon, the screen angle setting unit preferably selects the second sheet as the sheet to have the output image recorded thereon and rotates the orientation of the image in conformity with the recording direction on the second sheet when the jaggy judging unit judges that jaggies will appear with the recording direction on the first sheet.

In this case, it is preferable that the output image recording directions of the first and second sheets differ by 90°; and that the screen angle setting unit includes a sheet selecting section that selects the second sheet as the sheet to have the output image recorded thereon when the jaggy judging unit judges that jaggies will appear with the recording direction on the first sheet and a page rotating section that generates image data rotated by 90° in conformity with the second sheet.

According to this construction, jaggies can be suppressed by a simple method for selecting the second sheet whose output image recording direction differs by 90° from that of the first sheet (e.g. A4) presently selected, i.e. selecting a sheet (e.g. A4-R) to be fed with the orientation thereof rotated by 90° as the sheet to have the output image recorded thereon.

In the above construction, if the image data includes a plurality of pieces of character information, the jaggy judging unit preferably performs and records a jaggy appearance judgment for each character, and judges whether or not a relative screen angle of the line screen with respect to the image data should be changed.

According to this construction, the jaggy appearance can be judged at very high speed since the jaggy appearance judgment is performed for each of the plurality of characters contained in the image data and recorded and the jaggy appearance is predicted after completing the judgment on all the characters.

In this case, the jaggy judging unit preferably includes a jaggy appearing character counter for the jaggy appearance judgment, increments the value of the jaggy appearing character counter if jaggies are judged to appear in the jaggy appearance judgment for each character while decrementing the value of the jaggy appearing character counter if jaggies are judged not to appear, and judges whether or not the relative screen angle of the line screen with respect to the image data should be changed based on the value of the jaggy appearing character counter after completing the judgment on all the characters.

According to this construction, the jaggy appearance can be judged at very high speed since the jaggy appearance judgment is performed for each character and recorded in the jaggy appearing character counter and the final judgment is made based on the count value of the jaggy appearing character counter after completing the judgment on all the characters.

It is preferable that the jaggy judging unit includes an angular distribution integration recording table for recording the angular distribution of line segments character by character based on the angles of the line segments stored in the element angular storing unit; and that the screen angle setting unit changes the relative screen angle based on the recording result of the angular distribution integration recording table.

According to this construction, the angular distributions of the line segments of the font are integrated character by character for all the characters in the image data, and the optimal screen angle of the line screen is selected from the result of the angular distributions after completing the integration of the angular distributions of all the characters. Thus, the screen angle for accurately suppressing jaggies can be selected since the judgment is made based on all the line segment elements contained in the appearing character font.

In the above construction, the image conversion unit preferably generates the line screen by a dither method using a stripe pattern.

In the above construction, the screen angle setting unit preferably changes the screen angle by replacing the line screen by the dither method using the stripe pattern.

An image output method according to another aspect of the present invention comprises the steps of converting image data into an output image of intermediate gradation using a line screen for forming pixel points in stripes; obtaining the angle information of line segments of the image data; and setting a screen angle of the line screen based on the angle information of the line segments such that a jaggy phenomenon appearing on the outline of the output image is suppressed.

According to the above image output method, the screen angle is preferably set through selection from sheets having different output image recording directions.

An image output program product according to still another aspect of the present invention comprises a storage medium; and an image output program stored in the storage medium, wherein the image output program causes an image output apparatus capable of performing an image output operation to perform a processing of converting image data into an output image of intermediate gradation using a line screen for forming pixel points in stripes; a processing of reading the angle information of line segments of the image data stored beforehand; and a processing of setting a screen angle of the line screen based on the angle information of the line segments such that a jaggy phenomenon appearing on the outline of the output image is suppressed.

According to the above image output method and image output program product, an image with suppressed jaggies can be outputted since the screen angle is set to suppress the jaggy phenomenon if the jaggy appearance is predicted upon expressing the intermediate gradation by a dither method using the line screen.

This application is based on patent application Nos. 2007-136271, 2007-136272, 2007-282922 and 2007-282923 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An image output apparatus, comprising:
an image conversion unit that converts image data into an output image of intermediate gradation using a line screen for forming pixel points in stripes, the image data including a plurality of color elements;
an element angle storing unit that stores the angle information of line segments of the image data for each color;
a jaggy judging unit that judges whether or not jaggies will appear on the outline of the output image based on the angle information of the line segments stored in the element angle storing unit; and
a screen angle setting unit that substantially changes the screen angle of the line screen if jaggies are judged to appear by the jaggy judging unit such that the angle difference between the screen angle of the line screen for each color element and the angle of the line segments for each color element is equal to or above a specified threshold value, wherein,
if a first screen angle is set for a first color element and a second screen angle is set for a second color element in the case of outputting a color image, the screen angle setting unit changes the screen angle of the first color element from the first screen angle to the second screen angle when the jaggy judging unit judges that jaggies will appear in an image relating to the first color element while judging that jaggies will not appear in an image relating to the second color element.

2. An image output apparatus according to claim 1, wherein the screen angle setting unit sets the screen angle of the line screen such that an angle difference between the angle of the line segments of the image data and the screen angle of the line screen is an angle difference at which jaggies appearing on the outline of the output image can be substantially suppressed.

3. An image output apparatus according to claim 1, wherein the jaggy judging unit judges the jaggy appearance if the angle difference between the angle of the line segments stored in the element angle storing unit and the screen angle of the line screen is equal to or below a specified threshold value.

4. An image output apparatus according to claim 1, wherein the element angle storing unit stores the angle information on the line segments of the character font of the image data or the italic angle information of italic characters.

5. An image output apparatus according to claim 1, wherein the screen angle setting unit selects the screen angle of the line screen for each color element from a plurality of screen angles of the line screen set beforehand.

6. An image output apparatus according to claim 1, wherein the screen angle setting unit rotates the screen angle of the line screen by 90° in a direction to suppress a jaggy phenomenon.

7. An image output apparatus according to claim 6, wherein:
the image data includes a plurality of color elements;
the element angle storing unit stores the angle information of the line segments for each color element; and
the screen angle setting unit can rotate the screen angles of all the line screens for the respective color elements by 90°.

8. An image output apparatus according to claim 1, wherein the image conversion unit generates the line screen by a dither method using a stripe pattern.

9. An image output apparatus according to claim 8, wherein the screen angle setting unit changes the screen angle by replacing the line screen by the dither method using the stripe pattern.

10. An image output apparatus according to claim 1, comprising:
an image conversion unit that converts image data into an output image of intermediate gradation using a line screen for forming pixel points in stripes;
an element angle storing unit that stores the angle information of line segments of the image data;
a jaggy judging unit that judges whether or not jaggies will appear on the outline of the output image based on the angle information of the line segments stored in the element angle storing unit; and
a screen angle setting unit that substantially changes the screen angle of the line screen if jaggies are judged to appear by the jaggy judging unit;
wherein, if a first sheet and a second sheet having different output image recording directions can be selected as a sheet to have an output image recorded thereon, the screen angle setting unit selects the second sheet as the sheet to have the output image recorded thereon and rotates the orientation of the image in conformity with the recording direction on the second sheet when the jaggy judging unit judges that jaggies will appear with the recording direction on the first sheet.

11. An image output apparatus according to claim 10, wherein:
the output image recording directions of the first and second sheets differ by 90°; and
the screen angle setting unit includes:
a sheet selecting section that selects the second sheet as the sheet to have the output image recorded thereon when the jaggy judging unit judges that jaggies will appear with the recording direction on the first sheet and,
a page rotating section that generates image data rotated by 90° in conformity with the second sheet.

12. An image output, comprising:
an image conversion unit that converts image data into an output image of intermediate gradation using a line screen for forming pixel points in stripes;
an element angle storing unit that stores the angle information of line segments of the image data;
a jaggy judging unit that judges whether or not jaggies will appear on the outline of the output image based on the angle information of the line segments stored in the element angle storing unit; and
a screen angle setting unit that substantially changes the screen angle of the line screen if jaggies are judged to appear by the jaggy judging unit;
wherein, if the image data includes a plurality of pieces of character information, the jaggy judging unit performs and records a jaggy appearance judgment for each character, and judges whether or not a relative screen angle of the line screen with respect to the image data should be changed.

13. An image output apparatus according to claim 12, wherein the jaggy judging unit:
includes a jaggy appearing character counter for the jaggy appearance judgment,
increments the value of the jaggy appearing character counter if jaggies are judged to appear in the jaggy appearance judgment for each character while decrementing the value of the jaggy appearing character counter if jaggies are judged not to appear, and
judges whether or not the relative screen angle of the line screen with respect to the image data should be changed based on the value of the jaggy appearing character counter after completing the judgment on all the characters.

14. An image output apparatus according to claim 12, wherein:
the jaggy judging unit includes an angular distribution integration recording table for recording the angular distribution of line segments character by character based on the angles of the line segments stored in the element angular storing unit; and
the screen angle setting unit changes the relative screen angle based on the recording result of the angular distribution integration recording table.

15. An image output method, comprising the steps of:
converting image data into an output image of intermediate gradation using a line screen for forming pixel points in stripes, the image data including a plurality of color elements;
obtaining the angle information of line segments of the image data; and
setting a screen angle of the line screen based on the angle information of the line segments such that an angle difference between the screen angle of the line screen for each color element and the angle of the line segments for each color element is equal to or above a specified threshold value, wherein,
if a first screen angle is set for a first color element and a second screen angle is set for a second color element in the case of outputting a color image, the screen angle setting unit changes the screen angle of the first color element from the first screen angle to the second screen angle when the jaggy judging unit judges that jaggies will appear in an image relating to the first color element while judging that jaggies will not appear in an image relating to the second color element so that a jaggy phenomenon appearing on the outline of the output image is suppressed.

16. An image output method according to claim 15, wherein the screen angle is set through selection from sheets having different output image recording directions.

17. An image output program product, comprising a storage medium; and
an image output program stored in the storage medium,
wherein the image output program causes an image output apparatus capable of performing an image output operation to perform:
a processing of converting image data into an output image of intermediate gradation using a line screen for forming pixel points in stripes, the image data including a plurality of color elements;
a processing of reading the angle information of line segments of the image data stored beforehand; and
a processing of setting a screen angle of the line screen based on the angle information of the line segments such that an angle difference between the screen angle of the line screen for each color element and the angle of the line segments for each color element is equal to or above a specified threshold value, wherein,
if a first screen angle is set for a first color element and a second screen angle is set for a second color element in the case of outputting a color image, the screen angle setting unit changes the screen angle of the first color element from the first screen angle to the second screen angle when the jaggy judging unit judges that jaggies will appear in an image relating to the first color element while judging that jaggies will not appear in an image relating to the second color element so that a jaggy phenomenon appearing on the outline of the output image is suppressed.

* * * * *